Patented Nov. 21, 1950

2,530,561

UNITED STATES PATENT OFFICE 2,530,561

DETHIOLIZING OF HYDROCARBONS BY MEANS OF ETHYLENE OXIDE

George B. Arnold, Glenham, and Howard V. Hess, Fishkill, N. Y., assignors to The Texas Company, New York, N. Y., a corporation of Delaware No Drawing. Application June 10, 1948, Serial No. 32,278

4 Claims. (Cl. 196—24)

This invention relates to the dethiolizing of hydrocarbons and contemplates the treatment of the hydrocarbons with ethylene oxide to effect desulfurization, particularly to effect the removal of the mercaptans. The invention is especially adapted for the dethiolizing of the lighter hydrocarbons such as normally gaseous hydrocarbons and light distillates such as gasoline, naphtha and kerosene.

We have discovered that by contacting hydrocarbons containing mercaptans a condensation reaction takes place between the ethylene oxide and the mercaptans. Apparently the labile hydrogen on the sulfur atom in the mercaptan molecule is displaced. The probable mechanism for the reaction is as follows:

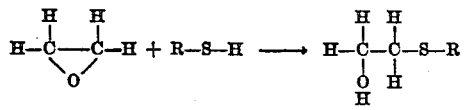

The condensation products formed in the reaction are beta-hydroxyethylalkyl or aryl thioethers. The condensation products are higher boiling than the hydrocarbon treated and consequently may be separated from the treated hydrocarbon by fractionation. When treating higher boiling stocks, such as kerosene, it is considered more practical to separate the hydrocarbon from the condensation products by water washing.

The reaction takes place to some extent at ordinary atmospheric temperature but to obtain a suitable rate of reaction it is desirable to conduct the treatment under moderately elevated temperatures such as about 150–250° F. Increasing the temperature to 300° F. for instance, appears to give no advantage.

The process is especially adapted for treating sour hydrocarbon gases and straight run or thermally cracked gasolines. The use of catalysts is not required although the process may be conducted in the presence of metal oxides or sulfides, if desired.

In an example of the invention a sour propane propylene mixture containing 0.03% (by weight) total lamp sulfur was contacted with 5% (by weight) of ethylene oxide in a closed bomb for a period of two hours while maintaining a temperature of 200° F. The treated gas was released leaving the residual reaction products in the bomb. The sulfur of the treated product was reduced by the treatment to 0.004%.

In another example, polymer naphthas produced by the polymerization of $C_3$ and $C_4$ olefins and containing 0.03% to 0.05% (by weight) of mercaptan sulfur were contacted with 5% (by weight) of ethylene oxide at temperatures of 200° F., 250° F. and 300° F. for periods of time approximating two hours. The treated products were distilled to separate the higher boiling condensation products. The naphthas thus recovered were negative to the Doctor test.

The condensation reaction products, the beta-hydroxyethylalkyl or aryl thioethers may be dehydrated to form vinylthioethers which are useful in making plastics.

Although a preferred embodiment of the invention has been described herein, it will be understood that various changes and modifications may be made therein, while securing to a greater or less extent some or all of the benefits of the invention, without departing from the spirit and scope thereof.

We claim:

1. The method of dethiolizing sour light hydrocarbons of the nature of normally gaseous hydrocarbons, gasoline and kerosene that comprises contacting the hydrocarbons with ethylene oxide at a temperature of the order of 150–250° F. to effect reaction between the ethylene oxide and mercaptans to form condensation products higher boiling than the hydrocarbons and subjecting the products of reaction to fractional distillation to separate the treated hydrocarbons from the condensation products.

2. The method of dethiolizing sour light hydrocarbons of the nature of gasoline and kerosene that comprises contacting the hydrocarbons with ethylene oxide at a temperature of the order of 150–250° F. to effect reaction between the ethylene oxide and mercaptans to form condensation products higher boiling than the hydrocarbons and subjecting the products of reaction to vaporization to separate the treated hydrocarbons from the condensation products.

3. The method of dethiolizing sour light hydrocarbons of the nature of normally gaseous hydrocarbons, gasoline and kerosene that comprises contacting the hydrocarbons with ethylene oxide at a temperature of the order of 150–250° F. to effect reaction between the ethylene oxide and mercaptans to form condensation products and washing the products of reaction to separate the treated hydrocarbons from the condensation products.

4. The method of dethiolizing sour normally gaseous hydrocarbons that comprises contacting the hydrocarbons with ethylene oxide in a closed chamber at a temperature of the order of 150–250°

F. to effect reaction between the ethylene oxide and mercaptans to form condensation products higher boiling than the hydrocarbons and separating the treated hydrocarbons from said condensation products by releasing the hydrocarbons as gases from the chamber leaving said condensation products as residue.

GEORGE B. ARNOLD.
HOWARD V. HESS.

REFERENCES CITED

The following references are of record in the file of this patent:

UNITED STATES PATENTS

| Number | Name | Date |
|---|---|---|
| 1,750,420 | Muhlenberg | Mar. 11, 1930 |
| 2,119,403 | Roberts | May 31, 1938 |
| 2,329,616 | Hoover | Sept. 14, 1943 |
| 2,402,878 | Doumani | June 25, 1946 |